April 10, 1973   J. A. MORGAN   3,726,779

MARINE ANTICORROSION ANODE STRUCTURE

Filed Jan. 11, 1971

INVENTOR.
JOHN ANGUS MORGAN
BY
William G. Babcock
ATTORNEY

United States Patent Office 3,726,779
Patented Apr. 10, 1973

3,726,779
MARINE ANTICORROSION ANODE STRUCTURE
John A. Morgan, 6037 Dunrobin Ave.,
Lakewood, Calif. 90713
Filed Jan. 11, 1971, Ser. No. 105,304
Int. Cl. C23f 13/00
U.S. Cl. 204—197                 1 Claim

ABSTRACT OF THE DISCLOSURE

An anticorrosion anode structure for protecting iron or steel portions of a boat that are subject to corrosion when immersed in water, which device includes at least one body of a metal that has a greater electrolytic solution tendency than iron. The body has a number of spaced copper electrodes embedded therein and extending therefrom.

Clamping means are provided to force the free ends of the copper electrodes into pressure contact with the metallic structure to be protected, with the copper serving the dual purpose of forming an electrical connection in a galvanic cell that is defined by the metal body and the surface to be protected, as well as so spacing the body from the surface that substantially the entire external area of the body is in contact with the water in which it is immersed. The body by the electrical potential between it and the surface to be protected prevents corrosion of the surface.

BACKGROUND OF THE INVENTION

Field of the invention

A marine anticorrosion anode structure.

Description of the prior art

It is generally recognized that corrosion of bodies of iron or steel that are immersed in water, particularly saltwater, results from an electrical process set up by many small galvanic cells. These cells are formed by a difference in electrical potential from one area to another of the iron or steel body due to variations in the chemical composition of the metal. This variation in chemical composition in the metal causes a flow of electrical current from the anodic areas to the cathodic areas, which dissolves the anodic spots or areas due to the current requirement of cathodic areas. Thus, even a metal of apparently uniform and homogenous texture may corrode when exposed to water. This corrosion characteristic of iron or steel surfaces is accentuated when the metal is in contact with a different metal such as copper or bronze as frequently occurs in the structure of boats and other marine vehicles or structures.

The corrosion reaction of iron or steel in a water system is electrical in nature and can be referred to as an arbitrary standard of zero. A metal in the electromotive series that has a large positive voltage has an extreme tendency for dissolution in water, while a metal possessing a substantial negative voltage indicates no great tendency for the metal to dissolve. Since iron is above hydrogen in electrolytic solution tendency (thus having a greater solution tendency) iron can displace hydrogen gas from an aqueous solution. Zinc has a greater tendency to dissolve in water and thus more easily displaces hydrogen from water than does iron. On the other hand, copper has very little tendency to dissolve, and as is well known, copper has excellent resistance to corrosive attack by water.

It has long been recognized that different metals in contact with one another in electrical conductive solutions induce electromotive force differences which lead to a flow of electricity from the lower corrodible (anodic) to the less corrodible (cathodic) metal. Thus, iron in contact with copper in water corrodes at a relatively rapid rate which is a common occurrence in marine installations where such contact exists between copper or bronze fittings and steel components of a boat. For example, when copper and iron are in contact in an aqueous solution, the greater electrolytic solution tendency of iron causes the following reaction to take place:

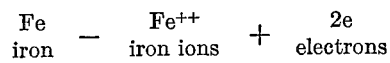

$$Fe - Fe^{++} + 2e$$
iron — iron ions + electrons

The electrons travel to the copper metal where they combine with hydrogen ions from water to form hydrogen atoms which either are released as a gas or combine with oxygen. Thus, no film of hydrogen is formed at the site of corrosion of the iron to protect the latter from further corrosion.

The primary object of the present invention is to supply an anticorrosion device for iron or steel surfaces immersed in water, such as occurs on boats and the like, by forming a galvanic coupling between a body of zinc and the surface to be protected. The galvanic coupling is characterized by a body of zinc that is clamped to the surface to be protected and the body having copper electrodes that are embedded therein and project therefrom. The free ends of the electrodes are in pressure contact with the surface to be protected, and the projecting portions of the electrodes also serve to so space the body of zinc from the surface to be protected that substantially the full external area of the body is in contact with the water in which it is immersed. The anodic metal due to this full surface contact may disintegrate at a maximum rate and establish an electric current of maximum value due to the low electrical resistance between the anodic metal and the surface to be protected. Due to the electrical current so provided, there is no tendency for the surface subject to corrosion to appreciably deteriorate by contact with water.

SUMMARY OF THE INVENTION

An anticorrosion device for use on marine structures and metal portions thereof that deteriorate when exposed to or immersed in water, which device includes at least one body of anodic metal, preferably zinc, that has a number of spaced copper electrodes embedded therein and projecting therefrom. Clamping means are provided for forcing the free ends of the copper electrodes into pressure contact with the metal defining the surface that is to be protected.

The clamping means and electrodes cooperate to provide a galvanic cell in which the zinc metal is the anode, and the metal to be protected the cathode. The copper electrodes provide the dual function of establishing the electrical path of low resistance from the anode to the cathode to protect the latter, and also to space the anode metal body from the surface to be protected so that the body is substantially fully exposed to the action of the water in which it is immersed. The body will disintegrate at a maximum rate to provide an electrical potential of maximum value.

A major object of the invention is to provide an anticorrosion device for installation on marine structures to protect the latter from deteriorating when immersed in water, and the device when so mounted establishing an electrical potential to prevent such corrosion taking place.

Another object of the invention is to supply an anode assembly that may be removably clamped to either a propeller shaft or other desired ferrous portion of a ship structure, with the assembly when so mounted holding at least one body of an anodic metal in spaced relationship with the surface to be protected, and establishing a path of minimum electrical resistance from the anodic body to the metal such as iron or steel that tends to disintegrate when immersed in water.

Yet another object of the invention is to supply an anticorrosion device that has an extremely simple mechanical structure, can be fabricated from standard commercially available materials, is easy to mount on and remove from a marine structure such as a boat or the like, and one that effectively protects an iron or steel marine structure from corrosion due to substantially the full external surface of the anodic metal body being exposed to the water in which it is immersed.

DESCRIPTION OF THE PREFERRED EMBODIMENTS

Figure 1:
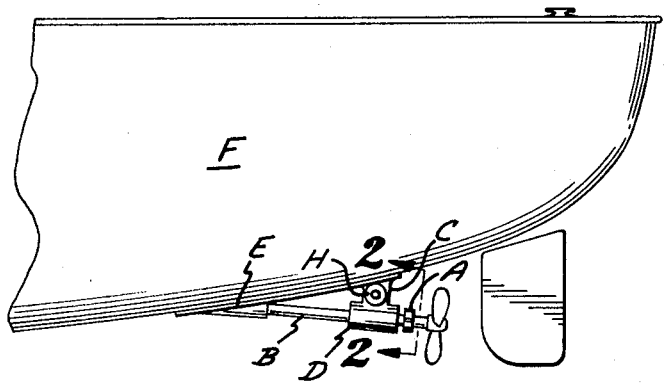
FIG. 1 is a side elevational view of the rearward portion of a boat or vessel, illustrating a propeller shaft supporting strut, and both the shaft and the strut being protected against corrosion by first and second forms of the invention mounted thereon.

A first form A of an anode assembly is shown removably mounted on a propeller supporting shaft B. The shaft B is rotatably supported by a metallic strut C that has a bearing D secured thereto. The strut C is supported by an elongate flange E from the hull F of a vessel. The vessel F, as is conventional with such structures, includes a rudder G for guiding purposes.

The first form A of the anode assembly includes two semi-circular segments 10 of a metal, preferably zinc or an alloy thereof, which metal has a tendency to dissolve when exposed to water. The metal chosen for the segments 10 should have a substantially higher positive voltage on the electromotive series than the iron or steel components of the vessel F that are to be protected. Each of the segments 10 has two slots 12 formed in edge portions thereof as may best be seen in FIG. 2, and the slots cooperating with the segments to define two flanges 14.

Each pair of adjacently disposed flanges 14 has axially aligned bores 16 formed therein through which a screw or bolt 18 extends that is engaged by a nut 20. Each of the semi-circular segments 10 has a number of circumferentially spaced, radially extending copper electrodes 22 situated therein which electrodes may be either cast into the metal, or pressure fit into cavities formed therein. It will be particularly noted that the electrodes 22 are of such length that first ends 22a are adjacently disposed to the exterior surface 24 of the segments.

Figure 2:
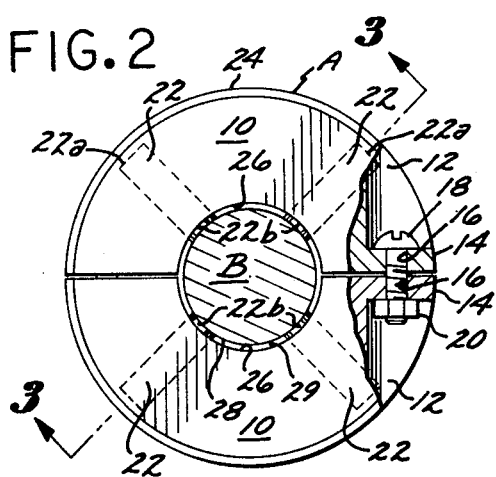
FIG. 2 is an end elevational view of a first form of the device mounted on a propeller shaft.
Figure 3:
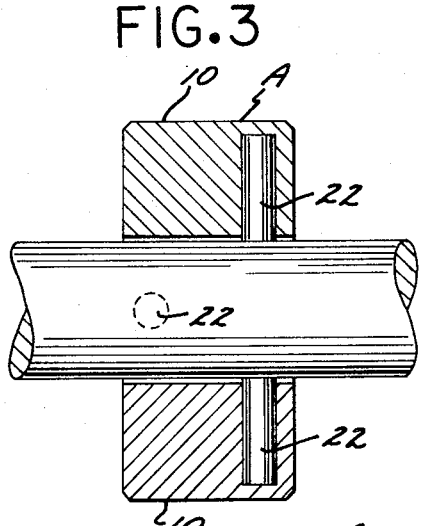
FIG. 3 is a transverse cross sectional view of the first form of the device taken on the line 3—3 of FIG. 2.

Each of the electrodes 22 is of such length that it has an inner end portion 22b that projects from the interior surface 26 of the segments with which it is associated. The interior surface 26 has a somewhat greater radius of curvature than the external surface of the shaft B. When the two segments 10 are mounted on the shaft B as shown in FIG. 2, and the nuts 20 tightened on the screws or bolts 18, the end portions 22b of the electrodes are forced into pressure contact with the external surface 28 of shaft B. It will be particularly noted that the electrodes 22 not only serve to establish electrical communication between the zinc segments 10 and the shaft B, but that the electrodes also space the surface 26 of the segments outwardly from the external surface 28 of the shaft. Thus, the surfaces 26 and 28 are separated by an annulus-shaped space 29.

When the vessel F is floating on a body of water, the anode assembly A is fully immersed, and substantially all external surface areas of the segments 10 are in contact with the water. Substantially all surfaces of the zinc segments 10 are exposed to water and tend to dissolve therein, with this action resulting in the zinc segment being at a maximum electrical potential. Full exposure of the external surfaces of the segments 10 to the water minimizes the tendency of the zinc to polarize, that is, form a thin film of hydrogen on the external surface thereof that insulates the zinc from the water. The anodic zinc segments 10 are electrically connected by electrodes 22 to the cathodic shaft B, and electrical current flows from the segments to the shaft to prevent the corrosion of the latter due to the action of water thereon.

Figure 4:
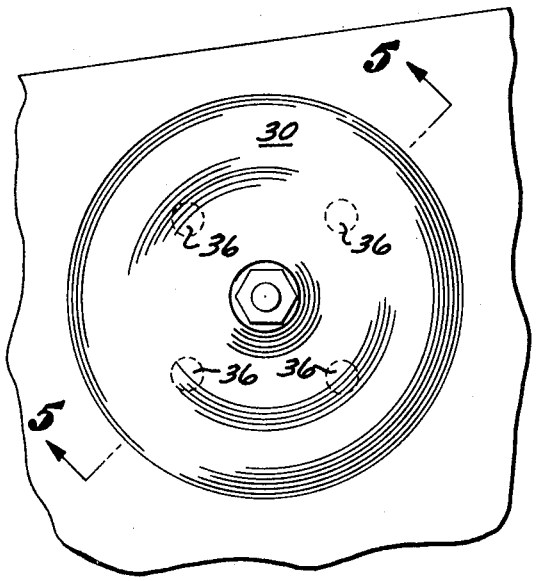
FIG. 4 is a side elevational view of a second form of the device.
Figure 5:
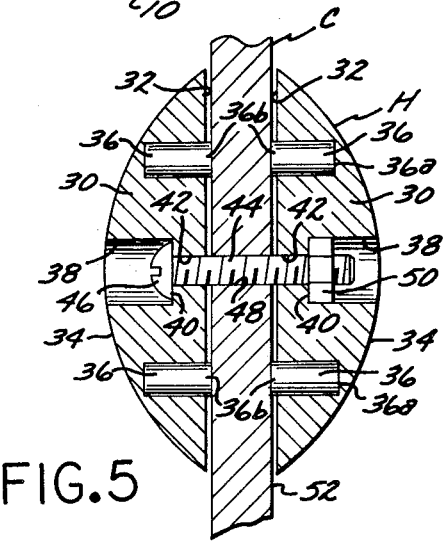
FIG. 5 is a transverse cross sectional view of a second form of the device taken on the line 5—5 of FIG. 4.

The second form H of the anode assembly as may best be seen in FIGS. 4 and 5 is particularly adapted for being removably mounted on the strut C that normally is in the shape of a plate. The second form H of the anode structure includes two laterally spaced bodies 30 that have adjacently disposed flat surfaces 32 and curved arcuate shaped surfaces 34. Bodies 30 are illustrated as being of circular configuration, although this shape is merely a matter of choice, and the bodies 30 may be of other desired configuration. Each body 30 is formed from the same type of metal used in defining one of the segments 10. Each of the bodies 30 as may best be seen in FIG. 5 has a number of transversely positioned copper elements 36 embedded therein and extending outwardly therefrom. The outer projecting ends 36b of the elements 36 are in physical contact with the side surfaces of the strut C that is to be protected from corrosion.

The elements may be either cast into the metal defining the bodies 30, or forced into a pressure fit with cavities formed therein. Irrespective of the manner in which the elements 36 are secured in fixed positions relative to the bodies 30, each element has an outwardly projecting portion 36b that extends a substantial distance beyond the surface 32. The bodies 30 have axially aligned bores 38 defined therein, with each of the bores developing into a body shoulder 40 from which a counterbore 42 extends. A screw 44 is provided that has a head 46 that seats on one of the body shoulders 40, with the shank of the screw extending through a bore 48 formed in the strut C. The shank extends through the bore 42 in tthe body 30 opposite to that in which the head 46 is positioned, with the shank being engaged by a nut 50.

By tightening the screw 44, the head 46 and nut 50 are forced into gripping contact with the shoulders 40, and the end portions 36b of the electrodes 36 are forced into pressure contact with the external surface of the strut C. The second form H of the invention operates in the same manner as the first form A, with the elements 36 serving to conduct electrical current from the bodies 30 to the strut C, as well as serving to space the surfaces 32 from the external surfaces 52 of the strut to permit the water in which the strut is immersed to have maximum surface contact with the bodies.

Due to the structure of the second form H of the anode assembly, substantially the entire external surfaces of the bodies 30 are exposed to the action of the water in which they are immersed, and the electrodes 36 also assuring excellent electrical communication between the bodies 30 and the strut C to permit flow of electrical current from the bodies to the strut with a minimum of electrical resistance. The second form H of the anode assembly protects any iron or steel portions of the vessel F in electrical communication with the strut C or bearing D in the same manner as the first form A of the invention protects the shaft B.

Either the first form A or second form H of the anode assembly will protect any iron or steel component of the vessel F that is in electrical communication with the anode segments 10 or bodies 30.

I claim:
1. A cathodic protection structure comprising:
(a) a metal strut having first and second oppositely disposed side surfaces and an opening extending therethrough;
(b) two anodic bodies disposed on opposite sides of said strut, with each of said bodies having an axially aligned bore and a counterbore defined therein that at their junction define a body shoulder, with said bores and counterbores being axially aligned with said opening;
(c) a plurality of rigid electrical conducting elements formed from a copper material, said elements partially embedded in said bodies and projecting outwardly therefrom to contact said strut to maintain said bodies in laterally spaced relation therefrom so as to permit maximum surface exposure of said bodies;
(d) a bolt that includes a head and threaded shank; and
(e) a nut in one of said bores that engages said threaded shank when said head is the other of said bores and said threaded shank extends through said opening and counterbores, with said nut when tightened forcing said head and nut into pressure contact with said body shoulders and said elements into pressure contact with said strut so as to removably attach said bodies to said strut.

References Cited
UNITED STATES PATENTS

| | | | |
|---|---|---|---|
| 2,067,839 | 1/1937 | Godfrey | 204—197 |
| 2,619,455 | 11/1952 | Harris et al. | 204—197 |
| 2,620,297 | 12/1952 | Stobie et al. | 204—197 |
| 2,762,771 | 9/1956 | Preiser | 204—197 |
| 3,553,094 | 1/1971 | Scott et al. | 204—197 |

TA-HSUNG TUNG, Primary Examiner